Feb. 21, 1939.  V. R. SIMONS  2,147,719
VEHICLE RADIATOR
Filed Aug. 17, 1934  2 Sheets-Sheet 1
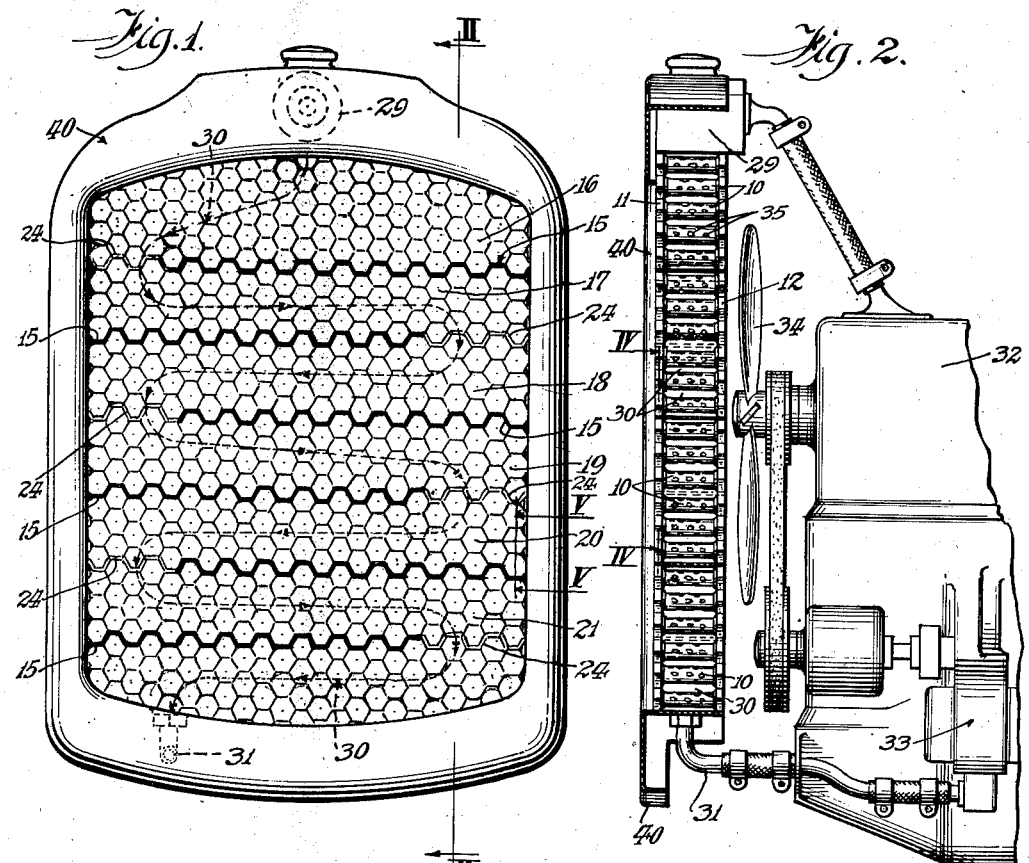
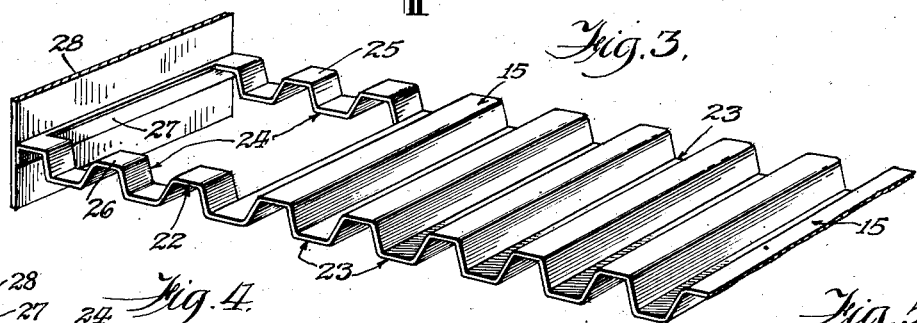
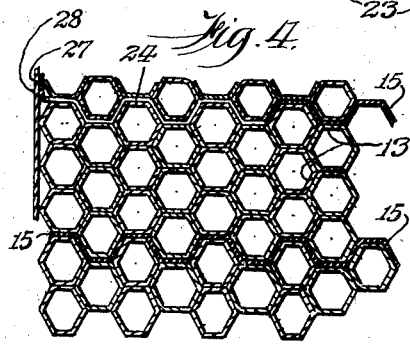
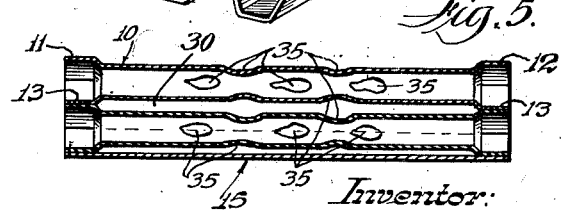
Inventor:
Ves R. Simons
By Harry C. Gebhart
Attorney Feb. 21, 1939. V. R. SIMONS 2,147,719
VEHICLE RADIATOR
Filed Aug. 17, 1934 2 Sheets-Sheet 2
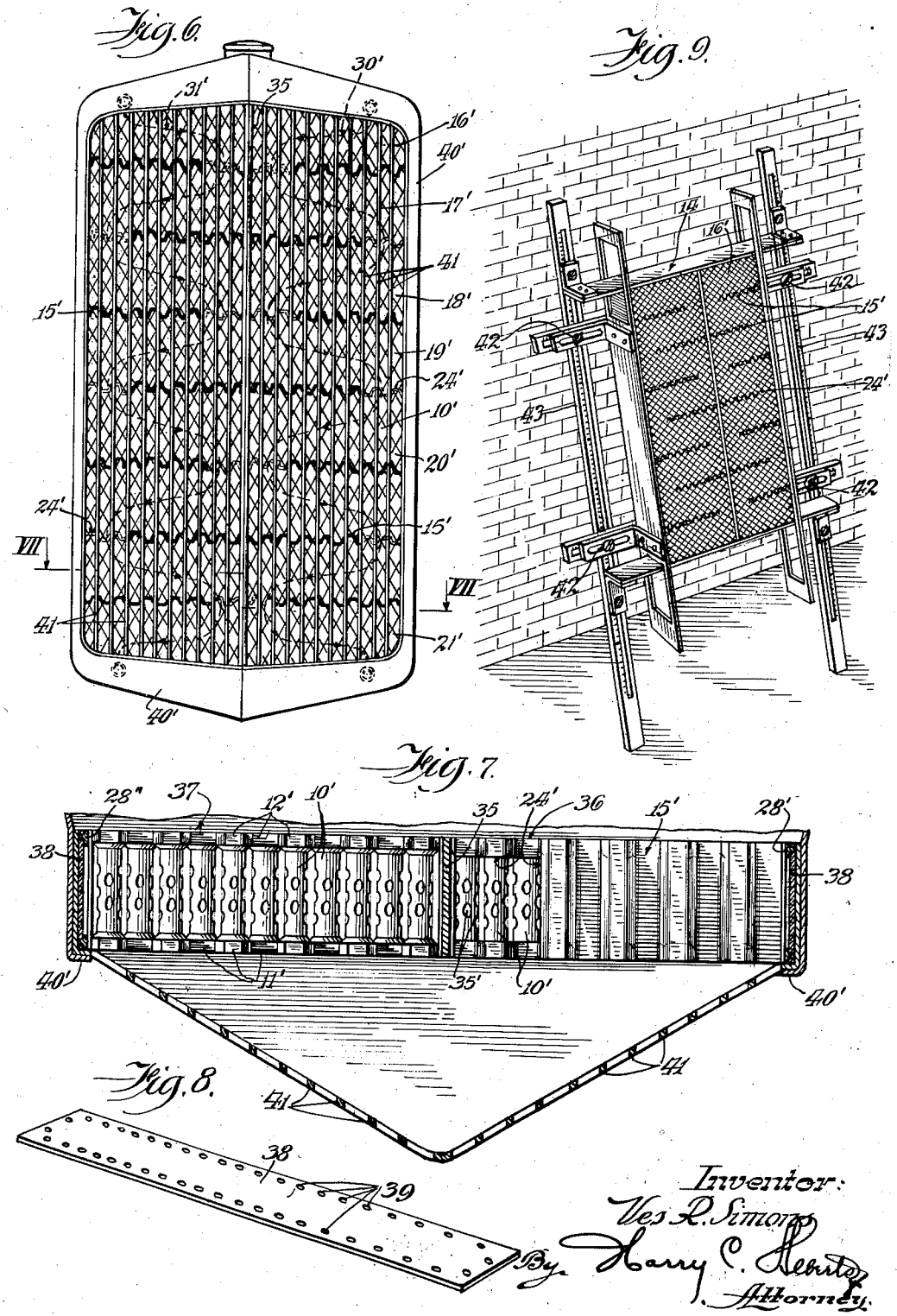

Patented Feb. 21, 1939

2,147,719

UNITED STATES PATENT OFFICE 2,147,719

VEHICLE RADIATOR

Ves R. Simons, Hammond, Ind., assignor of two-thirds to Blanche R. Simons, Hammond, Ind.

Application August 17, 1934, Serial No. 740,213

4 Claims. (Cl. 257—128)

This invention relates to new and useful improvements in radiators and more particularly to motor vehicle radiators, although certain features thereof may be employed with equal advantage for other purposes.

It contemplates more especially the provisions of a radiator of increased cooling efficiency and capacity without any appreciable increased requirement of size or cost of manufacture.

Many types of radiators have heretofore been proposed for vehicle and other situations involving internal combustion engines, but these have not proven entirely adequate in fulfilling the requirements of modern engines in that the highest degree of heat absorption and dissipation is not acquired therefrom. While vehicle radiators have been greatly improved in design and have been increased in capacity over previous design, yet these have not proven entirely satisfactory to meet the requirements of modern engines which are high speed and require greatly increased cooling capacity. Maximum capacity and efficiency are obtainable with a combination of features that contribute to the maximum heat absorption and dissipation, yet these individual features in one form or another have been known in the art without their combined value being observed or appreciated to obtain greatly increased cooling capacity and efficiency.

The improvement in modern engines that operate at much higher speeds than heretofore, requires a cooling expedient such as radiator of greater capacity and efficiency than has heretofore been obtainable. Then too, radiators of known construction rely entirely upon fan operation to procure the necessary cooling effect, and this proves very troublesome when fan operation becomes impaired for one reason or another. It is manifest, therefore, that increased cooling capacity and heat absorption is a requirement that has heretofore been sought but never accomplished to the degree that is obtainable by resort to a new combination of individually known features that have proven so effective in providing more efficient radiation for cooling engines.

One object of the present invention is to simplify the construction and improve the operation of devices of the character mentioned.

Another object is to provide an improved radiator that is capable of increased heat absorption and dissipation to provide greater cooling capacity and efficiency for engine operation.

Still another object is to provide a radiator having a plurality of spaced tubes with means interposed therebetween to provide a circuitous path for the cooling or tempering fluid.

A further object is to provide improved means for arranging radiator tubes in space relation with a series of baffles for defining a circuitous path for the tempering fluid.

A still further object is to provide an improved method of assembling radiator tubes in spaced relation with means interposed for defining a circuitous path for the tempering fluid.

Still a further object is to provide an improved radiator that is more effective and possesses greater capacity than radiators of the same size heretofore proposed for cooling engines.

Other objects and advantages will appear from the following description of an illustrated embodiment of the present invention:

In the drawings:

Figure 1 is a front view elevation of a device embodying features of the present invention.

Figure 2 is a sectional view taken substantially along lines II—II of Figure 1.

Figure 3 is a perspective view of a baffle plate embodying features of the present invention.

Figure 4 is an enlarged transverse sectional view taken substantially along lines IV—IV of Figure 2.

Figure 5 is a sectional view taken substantially along line V—V of Figure 1.

Figure 6 is a front view elevation of a modified radiator structure embodying features of the present invention.

Figure 7 is a sectional view taken substantially along line VII—VII of Figure 6.

Figure 8 is a perspective view of a detachable plate utilized in connection with the radiator disclosed in Figure 7.

Figure 9 is a perspective view of an adjustable frame which is utilized in assembling the individual units to comprise a radiator of the type embodying features of the present invention.

The structure selected for illustration comprises a radiator of any desired configuration and size depending upon the requirements of any particular installation and the dictates of commercial practices. In this instance, a plurality of elongated cylindrical tubes 10 are provided with enlarged extremities 11 and 12 of polygonal configuration providing complemental faces 13 with adjacent tube extremities adapted to contact with each other for the purpose of maintaining them in a predetermined space relation to permit water or any other tempering fluid to pass thereover and therebetween for the purpose of conducting the heat therefrom to the walls of the tubes 10, as will appear more fully hereinafter. The enlarged extremities 11 and 12 are, in this instance, of hexagonal figuration so that the body of the tubes 10 will be uniformly spaced from each other to provide a passage therebetween for the tempering fluid.

The tubes 10 are preferably arranged in a frame 14 which is adjustable to meet the particular requirements of any desired radiator design or installation, and filled with tubes 10 in uniform spaced relation with their extremities 11 and 12 having their flat surfaces 13 in adjacent contact. Thereupon, baffle plates 15 are interposed between a predetermined number of tubes 10 for horizontal disposition to define uniform horizontal sections 16, 17, 18, 19, 20, 21 or any greater or lesser number thereof depending upon the size of the radiator unit and as commercial practice may dictate. As shown, the baffle plate 15 is corrugated so as to provide semi-hexagonal nodes 22 and troughs 23 which are complemental to the tube extremities 11 and 12 for support thereon and between confronting baffle plates 15 that are disposed horizontally to bridge the edges of the frame defined by the side plates 28.

It will be noted that the baffle plates 15 are provided with a substantially rectangular opening 24 approximate to one extremity thereof so as to leave longitudinal marginal edges 25 and 26 commensurate in breadth to the tube extremities 11 and 12 for support of the tubes 10 thereon. The baffle plates 15 are so arranged between a predetermined group of tubes 10 so that the openings 24 therein are alternately disposed adjacent to the vertical frame edge or outline of the radiator defined by the assembled tubes 10 so as to define a circuitous path for the fluid from section 16 downwardly to the successive sections 17, 18, 19, 20 and 21 so as to pass completely therethrough both vertically and horizontally in order to provide maximum heat absorption and dissipation. It is to be noted that the baffle plates 15 may have angularly bent edges 27 to enable adhesive attachment of the baffle plate 15 to vertical side plates 28 that may be utilized to provide a permanent radiator frame and define the outline thereof.

With this arrangement, water or other tempering fluid will pass from the upper reservoir 29 of a circulating system for downward movement around and between the tubes 10 along a course substantially defined by the dotted arrow lines 30 (Figure 1) for eventual discharge to a conduit 31 so as to effect recirculation through the engine 32 by resort to the proper fittings and the engine operated pump 33, which is conventional and customarily employed in connection with internal combustion engines. The movement of the vehicle, responsive to the engine 32, will impart motion to the air and thus pass through the interior of the tubes 10 so as to absorb the heat that is conducted thereto by contact of the water therewith. The fan 34 that revolves in response to engine operation is desirable but not entirely necessary with the radiator structure described supra, though it aids in drawing the air through the interior of tubes 10 which are provided with comparatively small exterior depressions or irregular concavities 35 throughout the circumference thereof so as to provide turbulence in the movement of the air within the tube and to the water that circulates therearound, thereby procuring the greatest possible contact for maximum heat absorption and dissipation in conjunction with the other features of the tubes 10 and their assembled relation with the baffle plates 15 as well as in their combination into a single unit.

In the modified structure shown in Figure 6, a similar type of radiator construction has been applied to the doubled unit having two separate systems of circulation such as would be most effective in connection with a V-type automobile engine. In this embodiment, a solid plate 35 is vertically interposed along the vertical median line so as to provide two distinct vertical sections 36 and 37. The tubes 10' are similarly assembled with their customary enlarged extremities 11' and 12' arranged for edge contact with baffle plates 15' provided within each vertical section 36 and 37 so that their openings 24' are alternately disposed relative to the vertical sides 28' and 35 and 35 and 28" of each vertical section 36 and 37 so as to define a separate circuitous path substantially as defined by the dotted arrow lines 30' and 31' in each vertical section 36 and 37 of the dual radiator described supra. Horizontal sections 16, 17, 18, 19, 20 and 21 are defined by the baffle plates 15' as described supra to define circuitous paths through their alternate end openings 24'.

Detachable side plates 38 having a plurality of apertures 39 along the marginal edges thereof, may be detachably secured to the vertical side frame members 28' and 28" of the radiator vertical sections 36 and 37 for detachable attachment by resort to fasteners such as threaded studs or any other suitable expedient for that purpose. These removable plates 38 on either side of sections 36 and 37 enable interior accessibility for cleansing purposes. Of course, ornamented and nicely polished shells 40 may be provided to define the outline for the radiator unit as disclosed in Figure 1 and a similar shell 40' of specially adapted design may be provided to meet the requirements of the dual radiator units disclosed in Figures 6 and 7. Suitable grids 41 may be applied to the front of the radiator for attachment along the edges of the radiator shell 40' so as to protect the radiator tubes 10 from foreign substances and conceal the structural features of the radiator front.

In the production of radiator units of this character, the tubes 10, baffle plates 15 and the side plates 28, 28', 28", and/or 35 constituting frame members are assembled in an adjustable frame 14 and held in tight contact by means of proper adjustment to the screw fasteners 42 utilized in connection with the assembling frame 43 of any desired design or construction. The entire unit is then edge-dipped in a bath of solder so as to effect adhesion at both extremities 11 and 12 of the tubes 10 with the baffles 15 and permanent frame members associated therewith. The entire unit is edge-dipped and the superfluous solder withdrawn from the interior of the tubes 10 to avoid obstruction thereto. Upon cooling, the temporary frame 14 is readily removed and the radiator unit is ready for use as described supra.

Various changes may be made in the embodiment of the invention herein specifically described without dissipating from or sacrificing any of the advantages of the invention as defined in the appended claims.

I claim:

1. A water cooling vehicle radiator core comprising a plurality of parallel tubes, each of said tubes having enlarged polygonal extremities, said tubes engaging each other at their enlarged extremities with the adjacent polygonal faces thereof in contact, and horizontally disposed parallel baffle plates for grouping said tubes into a plurality of superposed sections, said baffle plates being corrugated substantially as a complement to the polygonal extremities of said tubes for aligned and uniformly spaced support thereon, and each of said baffle plates having an opening provided therein at a predetermined position proximate to alternate side edges of said core to provide circuitous water circulation transversely over said corrugated baffle plates, tubes and between the extremities thereof.

2. A radiator core comprising a plurality of parallel tubes, each of said tubes having enlarged polygonal extremities, said tubes engaging each other at their enlarged extremities with the adjacent polygonal faces thereof in adhesive contact, said tubes having irregular surfaces to enlarge the thermal conducting area thereof, and horizontally disposed baffle plates for grouping said tubes into a plurality of sections, each of said baffle plates having an opening provided therein at alternate side edges thereof to provide circuitous water circulation transversely over said tubes and between the extremities thereof.

3. In a radiator, the combination with a casing having two compartments, a plurality of parallel tubes confined in each of said compartments, a plurality of horizontally disposed baffle plates for grouping said tubes into a plurality of sections in each of said compartments, each of said baffle plates having an opening provided therein at a predetermined position proximate to alternate side edges thereof to establish communication between adjacent sections of each compartment, said baffle plates being transversely corrugated along the length thereof to support said tubes in a predetermined relation, and means associated with each of said compartments for introducing and discharging water for separate circulation transversely over and around said tubes to effect circuitous circulation through successive sections of each of said compartments.

4. In a radiator, the combination with a casing having two compartments, a plurality of tubes confined in each of said compartments, each of said tubes having enlarged polygonal extremities for contact therebetween to maintain said tubes in uniformly spaced relation, a plurality of horizontally disposed baffle plates for grouping said tubes into a plurality of sections in each of said compartments, each of said baffle plates having an opening provided therein at a predetermined position to establish communication between adjacent sections, said baffle plates being transversely corrugated along the length thereof to support said tubes in a predetermined relation, means associated with each of said compartments for introducing and discharging water for separate circulation over and around said tubes of each compartment to effect circuitous circulation through successive sections therein, and detachable end plates to define the sides of said compartments to render said tubes available for cleansing purposes.

VES R. SIMONS.